United States Patent [19]
Llorens

[11] Patent Number: 5,570,037
[45] Date of Patent: Oct. 29, 1996

[54] SWITCHABLE DIFFERENTIAL TERMINATOR

[75] Inventor: Joseph R. Llorens, Winfield, Ill.

[73] Assignee: Methode Electronics, Chicago, Ill.

[21] Appl. No.: 278,025

[22] Filed: Jul. 20, 1994

[51] Int. Cl.[6] .................................................. H03K 17/16
[52] U.S. Cl. ............................ 326/30; 326/86; 326/90
[58] Field of Search ................................ 326/30, 86, 90

[56] References Cited

U.S. PATENT DOCUMENTS

| 4,748,426 | 5/1988 | Stewart | 326/30 |
|---|---|---|---|
| 4,859,877 | 8/1989 | Cooperman | 326/30 |
| 5,029,284 | 7/1991 | Feldbaumer | 326/30 |
| 5,239,559 | 8/1993 | Brach et al. | 326/30 |
| 5,331,206 | 7/1994 | Liron | 307/270 |
| 5,367,647 | 11/1994 | Coulson | 395/325 |
| 5,374,861 | 12/1994 | Kubista | 326/30 |
| 5,382,841 | 1/1995 | Feldbaumer | 326/30 |
| 5,466,975 | 11/1995 | Wratten | 307/100 |

FOREIGN PATENT DOCUMENTS

| 0531630 | 3/1993 | European Pat. Off. | G06F 13/40 |
|---|---|---|---|
| 0601467 | 6/1994 | European Pat. Off. | G06F 13/42 |
| 2269031 | 1/1994 | United Kingdom | G05F 1/571 |

Primary Examiner—Edward P. Westin
Assistant Examiner—Andrew Sanders
Attorney, Agent, or Firm—David L. Newman

[57] ABSTRACT

A method and apparatus electrically disconnects termination on a differential transmission bus. A switchable impedance matching termination apparatus is provided including a terminating resistor network for terminating at least one pair of a plurality of differential signal line pairs. An enabling signal input is also provided. Further, the invention has a first signal network interconnected between the enabling signal input and the terminating resistor network. Also provided is a second signal network interconnected between the enabling signal input and the terminating network wherein the first and second signal networks are responsive to the signal. The response is designed to terminate the at least one pair of the plurality of differential signal line pairs. A method is also provided for disconnecting terminating resistors on a device having a differential transmission line.

18 Claims, 6 Drawing Sheets

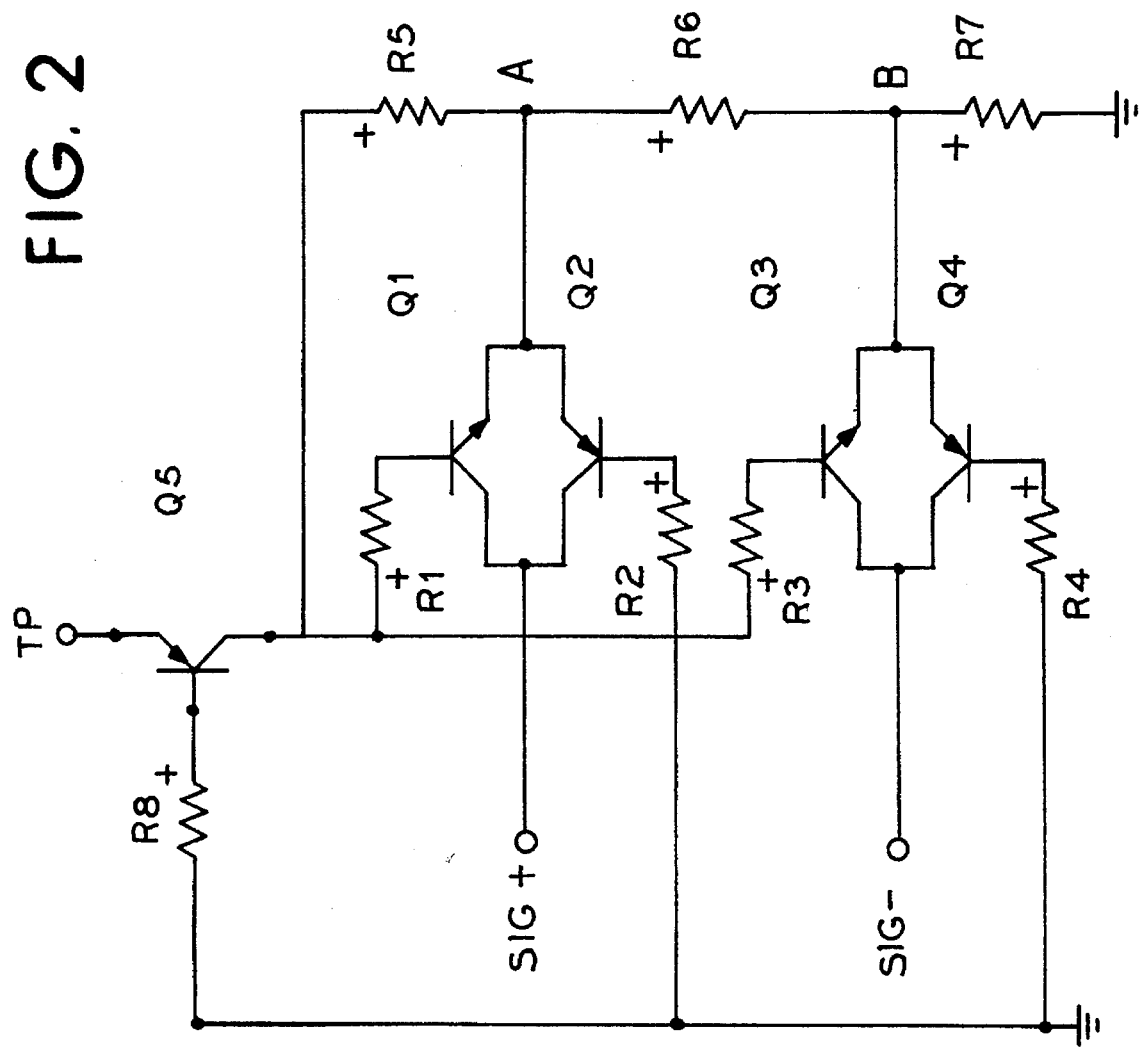
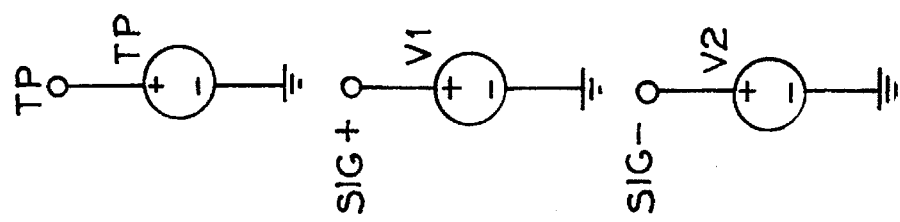
FIG. 2

SWITCHABLE DIFFERENTIAL TERMINATOR

BACKGROUND OF THE INVENTION

This invention relates generally to terminator devices. More specifically, the present invention relates to a switchable terminator apparatus and a method for using the apparatus for disconnecting terminating resistors on a device using a differential transmission bus.

To transmit signals reliably on a differential transmission bus, the bus must be terminated with an array of resistors at both ends, and only at the ends. Many devices are manufactured with these terminating resistors located on the device. This presents a problem with the devices that are not at the ends of the bus, thus the terminating resistors must be removed from these devices.

For example, peripheral devices connected to a computer may include disk drives, compact disk drives and output printers. The interface between the computer and the peripheral device is generally characterized by a bi-directional cable carrying high speed logic signals. All signals are transmitted via dedicated differential lines with an appropriate termination impedance.

Specifically, one application where reliable data transfer becomes important is in the field of data transmission on a fully loaded SCSI (acronym for small computer system interface) bus line for communication between a plurality of data transceivers and a central processing unit (CPU) in a small computer. A SCSI system has a transmission line over which a plurality of units coupled to the transmission line may communicate. A terminator is coupled to the two physical ends of the transmission line.

It is necessary to provide a terminating impedance on each such line which matches the characteristic impedance of the connecting cable used, in order to avoid line reflections. This termination is generally provided by means of a 330 ohm resistor connected to a ground, a second 330 ohm resistor connected to a voltage source, and a 150 ohm resistor connected to both of the 330 ohm resistors.

Further, in a system where only one peripheral device is connected to the transmission line, that peripheral device must also have such a termination network in order to avoid line reflection problems. Where a multiplicity of peripheral devices are connected to the same transmission line, then only one of the peripheral devices need have a termination network. The effect of paralleling several termination networks would reduce the effective terminating impedance to an incorrect value and would place an excessive load on the logic drive element.

In most present disk drive designs, a termination having a socket connected to each line to be terminated is used. The common points where the 150 ohm resistor connects to both of the 330 ohm resistors can be plugged into the socket. Also, the socket provides that the end of one 330 ohm resistor is connected to ground and one end of the other 330 ohm resistor is connected to an appropriate power supply. To connect the termination network to a particular peripheral device, an appropriate resistor array is plugged into such socket. If no termination network is required, the resistor array is omitted. In practice, this is provided by using a resistor array and a matching socket.

However, many peripheral device designs (for example, in some disk drive designs), space or other considerations demand that access to the printed circuit board containing the termination package be restricted. The circuit board, for example, may be mounted with the components facing away from the outside toward some other part of the disk drive structure. In such circumstances, it is thus necessary to remove or to partially dismantle the disk drive in order to gain access to the termination network. Some disk drive designs have attempted to resolve this problem by utilizing an angled socket so that, using appropriate tools, such as needle nose pliers, a termination package can be removed or inserted from the exposed edge of the board.

Thus, the prior art teaches mechanical disconnections by physically disconnecting the cables from the devices.

Accordingly, there has arisen a need in the computer equipment industry for an improved terminator apparatus and method for disconnecting the terminating resistors on a device using a differential transmission bus.

SUMMARY OF THE INVENTION

The present invention provides a method and apparatus for electrically disconnecting a termination of a differential transmission bus. A switchable impedance matching termination apparatus including a terminating resistor network for terminating at least one pair of a plurality of differential signal line pairs is provided. A method for disconnecting terminating resistors on a device having a differential transmission line is also provided.

To this end, in an embodiment, the present invention provides a switchable impedance matching termination apparatus including a terminating resistor network for terminating at least one pair of a plurality of differential signal line pairs, having enabling means for providing a signal to terminate, a first signal network interconnected between the enabling means and the terminating resistor network and a second signal network interconnected between the enabling means and the terminating resistor network, wherein the first and 10 second signal networks are responsive to the signal to terminate at least one pair of the plurality of differential signal line pairs.

In an embodiment, the present invention provides for a voltage to be supplied to the terminating resistor network during termination of the differential signal line pairs.

In an embodiment, the present invention provides the plurality of differential signal line pairs is a SCSI bus line.

In an embodiment, the present invention provides that the first signal network includes a first differential signal line, a first transistor, a second transistor, and two base resistors.

In an embodiment, the present invention provides that the second signal network includes a differential signal line, a first transistor, a second transistor and two base resistors.

In an embodiment, the present invention provides that the first transistor of each signal network is a PNP transistor and the second transistor of each signal network is an NPN transistor.

The present invention further provides a switchable terminator apparatus having means for electrically disconnecting a termination at an end of a differential signal line.

In an embodiment, the present invention provides an enabling means including a signal input, a resistor and a transistor which provides a voltage to the terminating resistor network during termination of the differential signal line pairs.

The present invention provides means for electrically disconnecting a termination at an end of a differential signal line and means for connecting a power supply to the means for electrically disconnecting the termination.

In an embodiment, the present invention provides a means for electrically disconnecting the termination at an end of a differential signal line including a pair of differential signal lines, each line interconnected to a pair of transistors, the transistors each also being connected to a base resistor.

In an embodiment, the present invention provides means for connecting a power supply to the means for electrically disconnecting the termination. The means for connecting comprises an enable input connected to one end of a base resistor and a transistor connected to a second end of the resistor.

The present invention further provides a terminator apparatus for electrically disconnecting terminating resistors on a device having a differential transmission line comprising at least one differential signal network, including a first differential signal line coupled to a first NPN transistor and to a first PNP transistor, the first NPN transistor coupled to a first resistor, the first PNP transistor coupled to a second resistor, the first resistor being further coupled to a means for providing a termination voltage and to a terminating resistor, the first NPN transistor and the first PNP transistor coupled to the terminating resistor and a second differential signal line coupled to a second NPN transistor and to a second PNP transistor, the second NPN transistor coupled to a third resistor, the second PNP transistor coupled to a fourth resistor, the third resistor further coupled to means for providing a termination voltage and to a terminating resistor and the second NPN transistor and the second PNP transistor being coupled to a terminating resistor.

In an embodiment, the present invention further provides a plurality of the signal networks equal to the number of differential signal line pairs on a SCSI bus line.

Further, the present invention also provides a method for disconnecting terminating resistors on a device using a differential signal transmission bus, having the steps of connecting a pair of differential signal lines through a differential signal line network to the terminating resistors; enabling a terminating voltage; and applying the terminating voltage to the terminating resistors.

In an embodiment, the present invention provides a method as described above, further including the step of removing the terminating voltage from the terminating resistors to conserve power drainage when the terminating voltage is not enabled.

In an embodiment, the present invention provides a method for disconnecting terminating resistors on a device using a differential signal transmission bus as described above, further including the step of providing that the differential signal network and the terminating resistors are duplicated for each differential signal line pair of the differential signal transmission bus and connecting the terminating voltage in parallel to each of the differential signal networks.

Accordingly, it is an advantage of the present invention to provide a method and apparatus for electrically disconnecting the terminating resistors on a differential transmission bus.

It is another advantage of the present invention to provide an improved terminator apparatus and method for electrically disconnecting the terminating resistors on a SCSI bus line so as to provide reliable and accurate data transmission.

It is a further advantage to provide an electrically switchable differential terminator apparatus that provides for remotely enabling and disabling a differential signal line termination without physically manipulating a terminating resistor network.

The above-listed and other advantages of the present invention may be achieved in a switchable differential signal line impedance matching terminator apparatus, comprising enabling means for providing a power source to a termination network, a first signal network, a second signal network, and a plurality of terminating resistors.

Additional features and further advantages of the present invention are described in, and will be apparent from, the detailed description of the presently preferred embodiments and from the drawings.

BRIEF DESCRIPTION OF THE DRAWINGS

FIG. 2 illustrates another detailed schematic circuit diagram of the present invention which relates to the waveforms in FIGS. 3, 4, 5 and 6.

DETAILED DESCRIPTION OF THE PRESENTLY PREFERRED EMBODIMENTS

The present invention provides an apparatus which electrically disconnects the termination of a differential transmission bus. A switchable impedance matching termination apparatus is provided including a terminating resistor network for terminating at least one pair of a plurality of differential signal line pairs. Also, a method is provided for disconnecting terminating resistors on a device having a differential transmission line.

Figure 1:
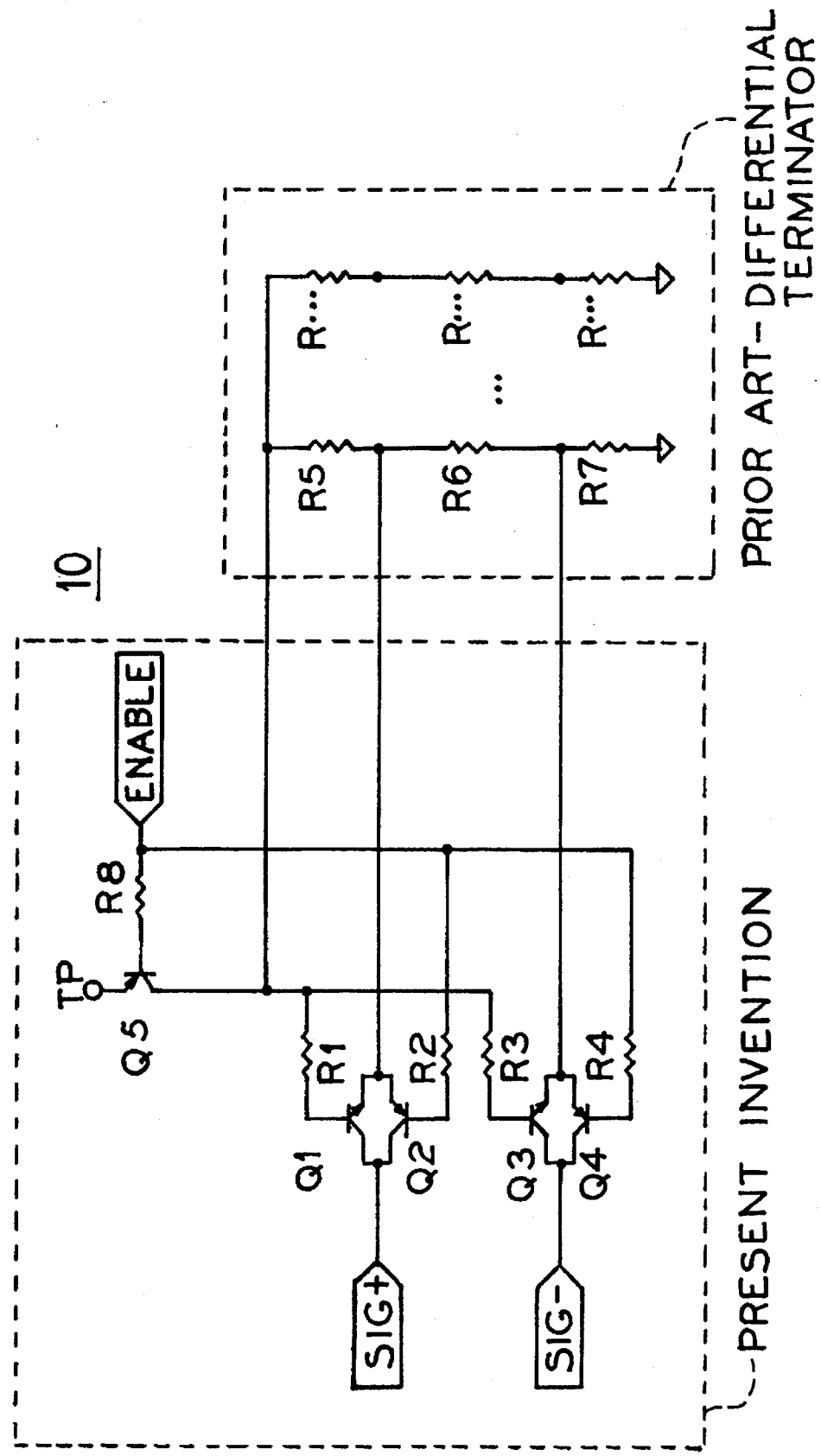
FIG. 1 illustrates a detailed schematic circuit diagram of the present invention.

Referring now to the drawings, FIG. 1 illustrates a detailed schematic diagram of an embodiment of the switchable differential terminator of the present invention. Specifically, a differential terminator, as is generally known, is illustrated and provides a terminating resistor network including resistors R5, R6, R7, etc. Resistor R5 has a typical nominal value of 330 ohms, as does resistor R7, whereas resistor R6 has a nominal value of 150 ohms in an embodiment. In addition, the switchable differential terminator circuit 10 is illustrated.

A voltage TP is coupled to a PNP transistor Q5. The voltage TP has a nominal value between +4.25 volts and 5.25 volts in an embodiment. A base resistor R8 having a nominal value of 270 ohms for example is connected to the base of the PNP transistor Q5. Additionally, an ENABLE signal input is provided and connected to the resistor R8. The ENABLE can be any embodiment of a logic level input. For example, the ENABLE can be embodied as an input signal having typical logic voltage levels of high or off of greater than 1.5 volts and a low or on of less than 0.8 volts. The ENABLE can also be embodied as an external switch. The collector of the PNP transistor Q5 is coupled to the terminating resistor network and also to a base resistor R1, having an exemplary value of 2200 ohms. R1 is further connected to an NPN transistor Q1.

Transistor Q1 is interconnected to transistor Q2, a PNP transistor of a type similar to transistor Q5 although other PNP transistors may also be used. The collectors of transistors Q1 and Q2 are coupled to a positive signal input SIG+ of a differential signal line. The emitters are coupled to the terminating resistor network. In addition, a second base resistor R2 having an exemplary value of 2200 ohms is connected to the base of transistor Q2 and also to the ENABLE input. Similarly, a negative signal input SIG− of the differential signal line is coupled to the collectors of another similar transistor pair Q3 (NPN) and Q4 (PNP). Also similarly, resistors R3 and R4 are base resistors provided in an embodiment that are also further connected to transistor Q5 and the ENABLE input, respectively.

The embodiment of the switchable differential terminator circuit illustrated in FIG. 1, having the transistors Q1, Q2, Q3, Q4 and resistors R1, R2, R3, R4, R5, R6 and R7 is repeated for each pair of differential signal lines. A typical SCSI bus, for example, has eighteen pairs of differential signal lines. The above connections to the collector of transistor Q5 and to resistor R8 which enable the termination are paralleled to each of these circuits.

As illustrated in FIG. 1, the terminating resistors R5, R6 and R7 are separated from the signal lines by pairs of PNP and NPN transistors Q1 (NPN), Q2(PNP) and Q3(NPN), Q4(PNP), respectively. These two pairs of transistors, Q1, Q2 and Q3, Q4, allow a signal to pass bi-directionally to the terminating resistors. The termination of the present invention is turned on by pulling the ENABLE point low. This operation will bias the base of the PNP transistors Q2, Q4 through resistors R2, R4 to put the transistors Q2, Q4 in saturation.

Likewise, doing this also will bias the base of transistor Q5 through resistor R8 to apply the voltage TP to bias the NPN transistors Q1, Q3 through resistors R1, R3 to put these transistors in saturation. The voltage TP will also then be applied to the terminating resistors R5, R6 and R7. In addition, the voltage TP is removed from resistors R5, R6 and R7 when a termination is not enabled in order to conserve on the drain of power.

When the ENABLE is high, no current is drawn from the transistor Q5 so that, in effect, it is turned off. Therefore, termination is not accomplished and voltage is removed from the terminating resistor network.

As is illustrated in FIG. 1, any number of peripheral devices may be terminated using the switchable differential terminator disclosed herein.

Implementation of a switchable differential termination circuit 10 may be made in several ways. Either discrete circuit components or integrated circuit technology may be used. The integrated circuit technology may take the form of a circuit designed specifically for this purpose or a standard integrated circuit which contains at least an appropriate number of necessary circuit elements and which has those elements connected together by means of a metallization pattern to generate the appropriate functions for the complete circuit. Both methods provide a cost effective solution.

FIG. 2 illustrates an embodiment of the present invention showing a different layout of the circuitry. As shown, TP is a voltage source having a value between +4.25 volts and +5.25 volts. SIG+ and SIG− are also voltage inputs. Points A and B are reference points for the voltage waveforms shown in FIGS. 3–6 described below.

For completeness in the disclosure of the above-described terminator apparatus but not for purposes of limitation, the following representative values and component identifications are submitted. Those skilled in the art will recognize that many alternative elements and values may be employed in constructing the circuits in accordance with the present invention.

| PART | TYPE OR VALUE |
| --- | --- |
| Q1, Q3 | Q2N2222A |
| Q2, Q4, Q5 | Q2N2907A |
| R1–R4 | 2200 Ω |
| R5, R7 | 330 Ω |
| R6 | 150 Ω |
| R8 | 270 Ω |

Now referring to FIGS. 3–6, voltage waveforms present during the operation of the invention are illustrated. Voltages corresponding to the transmission of a logic level "1" and a logic level "0" are illustrated. The voltages illustrated include the positive differential signal line voltage SIG+, the negative differential signal line voltage SIG−, the voltage at the junction of resistor R5 and resistor R6 which corresponds to point A on FIG. 2 and the voltage at the junction of resistor R6 and resistor R7 which corresponds to point B on FIG. 2.

Figure 3:
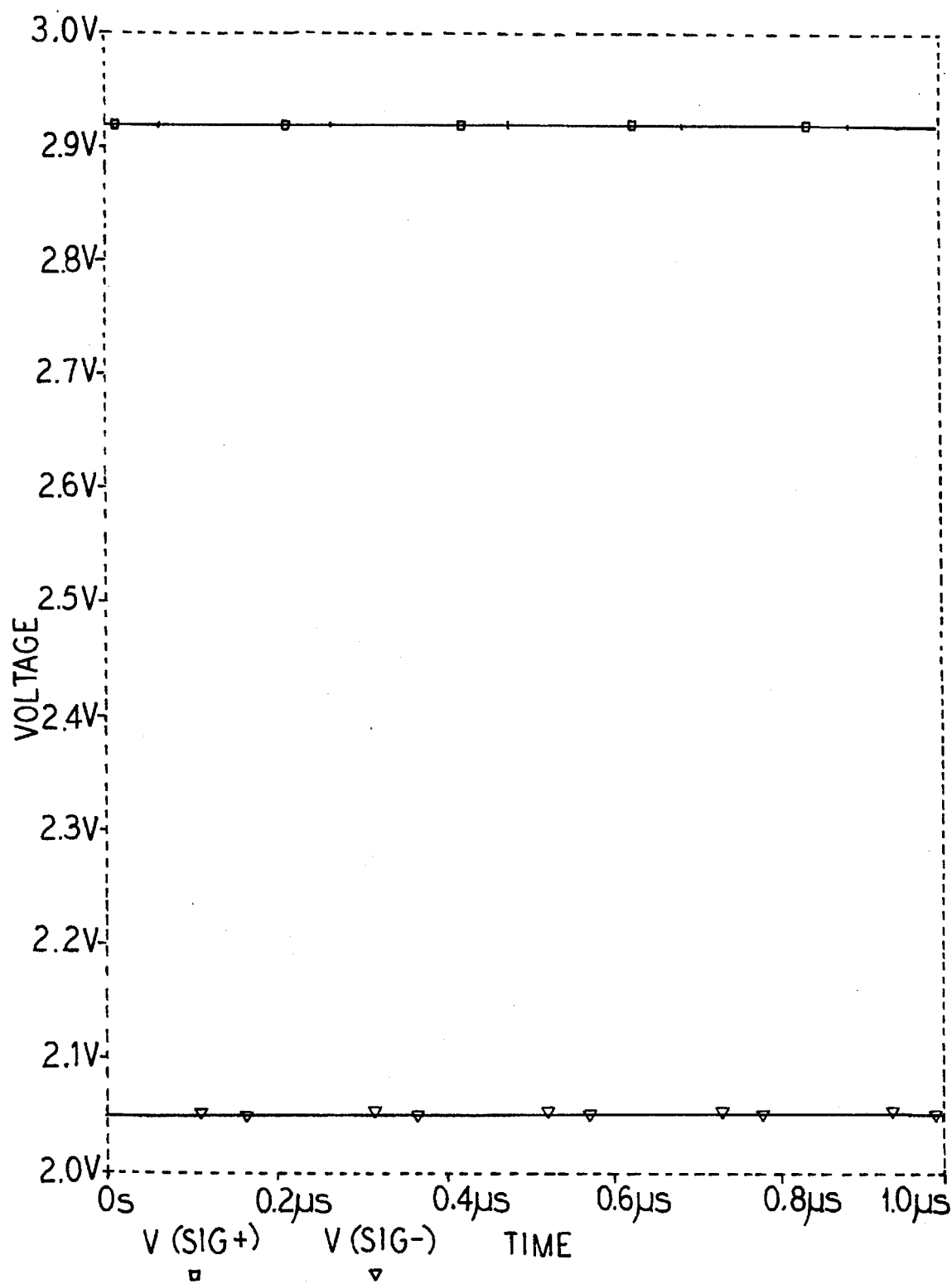
FIG. 3 illustrates waveforms that appear during the transmission of a logic level "1" data bit with termination turned on in the present invention.

Specifically, FIG. 3 illustrates the corresponding voltage levels for the transmission of a logic level of "1" in the present invention when the termination is turned on. As illustrated, the differential signal line voltage SIG+ and the voltage at point A are approximately 2.9 volts, whereas the differential signal line voltage SIG− and the voltage at point B are approximately 2.05 volts.

Figure 4:
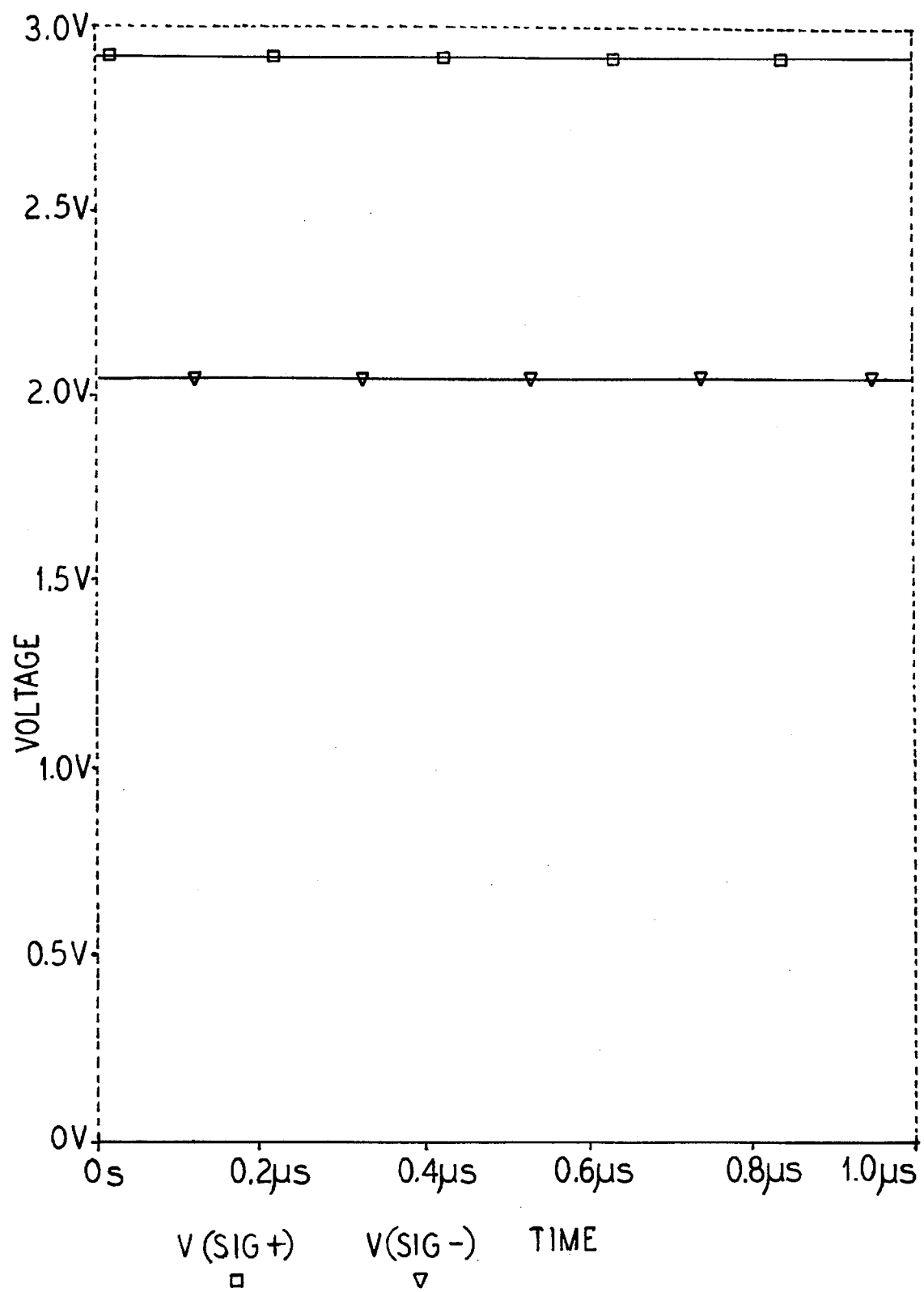
FIG. 4 illustrates waveforms that appear during the transmission of a logic level "1" data bit with termination turned off in the present invention.

FIG. 4 illustrates the voltage levels for the data transmission of a logic level of "1" with the termination off in the present invention. As illustrated, the voltages are: the voltages at points A and B of FIG. 2 are 0 volts, SIG− is 2.1 volts and SIG+ is 2.9 volts.

Figure 5:
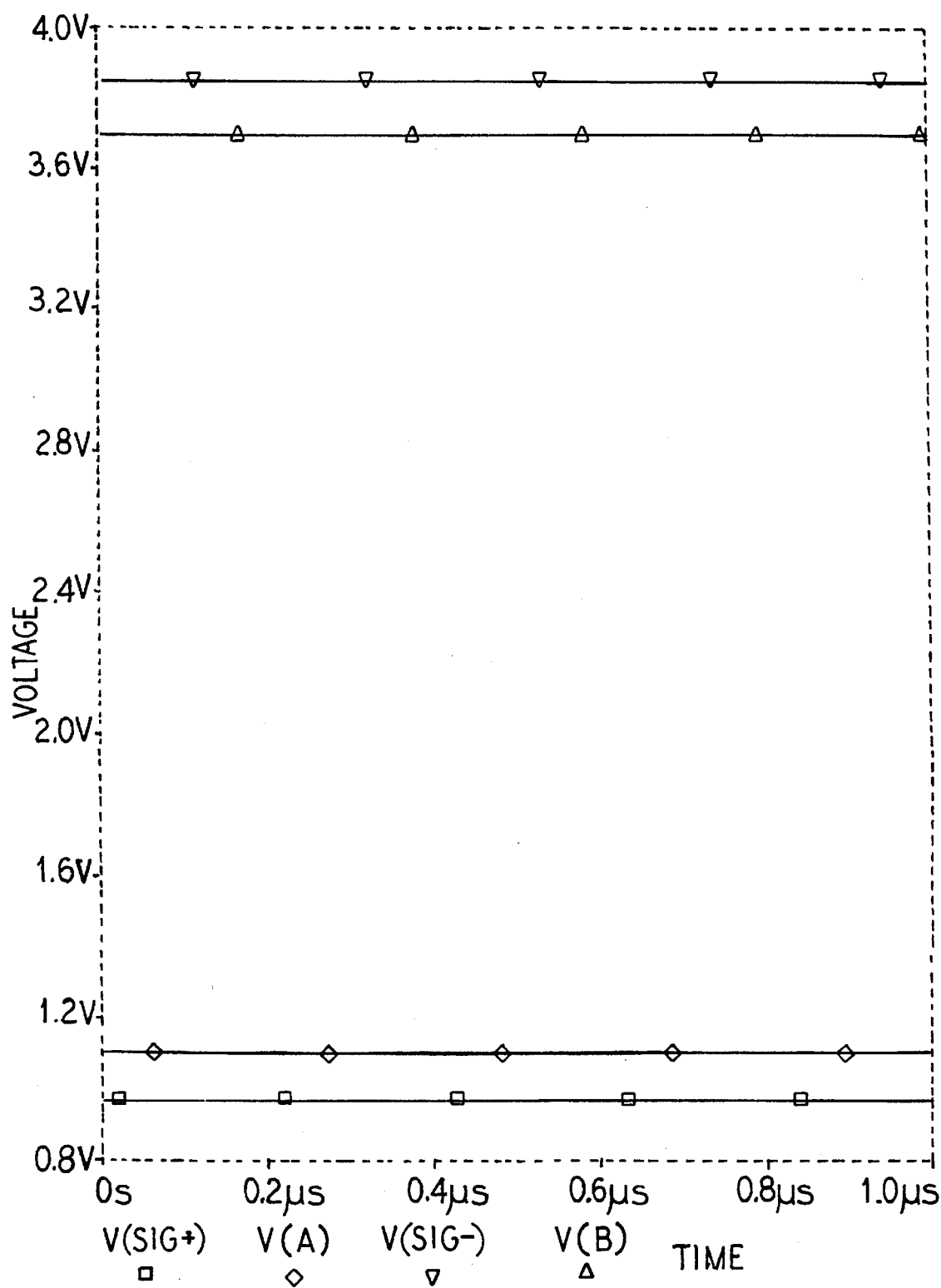
FIG. 5 illustrates waveforms that appear during the transmission of a logic level "0" data bit with termination turned on in the present invention.

Similarly, FIG. 5 illustrates the voltage levels for transmission of a logic level of "0" with the termination on in the present invention. The voltage levels illustrated are: SIG+ is 1.0 volts, point A is 1.1 volts, point B is 3.7 volts and SIG− is 3.85 volts.

Figure 6:
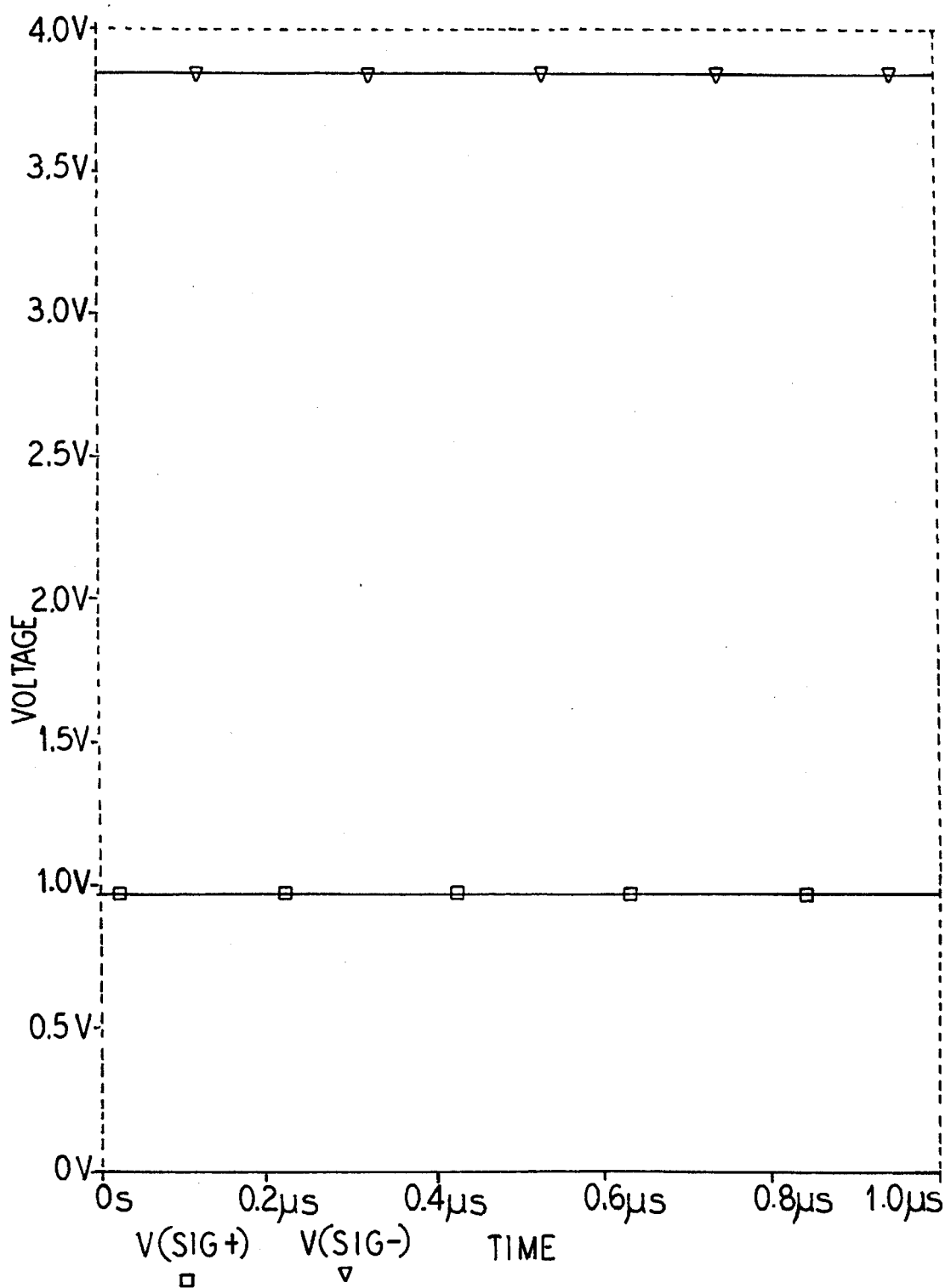
FIG. 6 illustrates waveforms that appear during the transmission of a logic level "0" data bit with termination turned off in the present invention.

Additionally, FIG. 6 illustrates the voltage levels for the data transmission of a logic level "0" with the termination off in the present invention. The voltage levels illustrated are: the voltages at points A and B of FIG. 2 are 0 volts, SIG+ is approximately 1.0 volts and SIG− is 3.85 volts.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A switchable impedance matching termination apparatus including a terminating resistor network for terminating at least one pair of a plurality of differential signal line pairs, the termination apparatus comprising:

an enabling means for providing a signal to terminate;

a first signal network interconnected between the enabling means and the terminating resistor network; and a second signal network interconnected between the enabling means and the terminating resistor network wherein the first and second signal networks are responsive to the signal to terminate the at least one pair of the plurality of differential signal line pairs.

2. The apparatus of claim 1 wherein the plurality of differential signal line pairs is a SCSI bus line.

3. The apparatus of claim 1 wherein the first signal network comprises a first differential signal line connected to a first transistor and a second transistor, each transistor further connected to a base resistor.

4. The apparatus of claim 3 wherein the first transistor is a PNP transistor and the second transistor is an NPN transistor.

5. The apparatus of claim 1 wherein the second signal network comprises a differential signal line connected to a first transistor and a second transistor, each transistor further connected to a base resistor.

6. The apparatus of claim 5 wherein the first transistor is a PNP transistor and the second transistor is an NPN transistor.

7. The apparatus of claim 1 wherein the enabling means includes a signal input connected to one end of a resistor and the other end of the resistor being connected to a transistor.

8. The apparatus of claim 7 wherein the transistor provides a voltage to the terminating resistor network during termination of the differential signal line pairs.

9. The apparatus of claim 1 further comprising:

means for providing a voltage to the terminating resistor network during termination of the differential signal line pairs.

10. A switchable terminator apparatus comprising:

means for electrically disconnecting a termination at an end of a differential signal line; and means for connecting a power supply to the means for electrically disconnecting the termination.

11. The apparatus of claim 10 wherein the means for electrically disconnecting the termination at an end of a differential signal line includes a pair of differential signal lines, each line interconnected to a pair of transistors, the transistors each being connected to a base resistor.

12. The apparatus of claim 10 wherein the means for connecting comprises an enable input connected to a first end of a base resistor and a transistor connected to a second end of the resistor.

13. The apparatus of claim 10 further comprising:

a voltage source.

14. A terminator apparatus for electrically disconnecting terminating resistors on a device having a differential transmission line, the terminator apparatus comprising:

at least one differential signal network having a first differential signal line coupled to a first NPN transistor and to a first PNP transistor, the first NPN transistor coupled to a first resistor, the first PNP transistor coupled to a second resistor, the first resistor further coupled to a means for providing a termination voltage and to a terminating resistor, the first NPN transistor and the first PNP transistor coupled to the terminating resistor; and a second differential signal line coupled to a second NPN transistor and to a second PNP transistor, the second NPN transistor coupled to a third resistor, the second PNP transistor coupled to a fourth resistor, a third resistor coupled to the means for providing a termination voltage and to a terminating resistor and the second NPN transistor and the second PNP transistor coupled to a terminating resistor wherein the first and second differential signal lines define a differential signal line pair.

15. The terminator apparatus of claim 14 wherein the number of signal networks is equal to the number of differential signal line pairs on a SCSI bus line.

16. A method for switchably connecting terminating resistors on a device using a differential signal transmission bus having a plurality of differential signal lines, the method comprising the steps of:

connecting one of the differential signal lines through a signal network to the terminating resistors;

enabling a terminating voltage;

applying the terminating voltage to the terminating resistors; and establishing a current path from the transmission bus, through at least one of the terminating resistors, to a ground once the termination voltage becomes enabled.

17. The method of claim 16 further comprising the step of:

disconnecting the terminating voltage from the terminating resistors to conserve power drainage when the terminating voltage is not enabled.

18. The method of claim 17 further comprising the steps of:

providing the signal network and the terminating resistors for each differential signal line of the differential signal transmission bus; and connecting the terminating voltage supply in parallel to the signal network.

* * * * *